United States Patent Office 3,223,716
Patented Dec. 14, 1965

3,223,716
TRIPHENYLPHOSPHORANYLIDENE-AMINO-1,2-NAPHTHOQUINONE
William Lindsay Mosby, North Plainfield, and Mary-Louise Silva, Somerville, N.J., assignors to American Cyanamid Company, Stamford, Conn., a corporation of Maine
No Drawing. Filed May 2, 1963, Ser. No. 277,443
3 Claims. (Cl. 260—396)

This invention relates to, and has for its object, the provision of new organo phosphorus compounds. More particularly, it relates to the provision of novel phosphoranylideneamino derivatives distinguished by an ortho-quinoid radical attached to the nitrogen of said phosphoranylideneamino moiety. It relates further to the novel method by which these derivatives are prepared, viz: The reaction of azido-orthoquinones with a trivalent phosphorus compound. The invention will be better understood if reference is made to the following detailed description taken in conjunction with the examples showing practice of all the aspects thereof.

The present invention is based on the discovery that the novel reaction of azido-orthoquinones with trivalent phosphorus compounds leads to products which are useful as dyestuffs, as the active components of insecticides, and as intermediates in the preparation of other organic compounds as will be described hereinafter. These products may be represented by the Formula I:

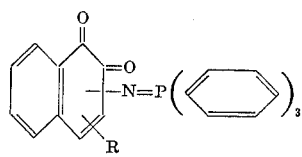

wherein R is either hydrogen or halogen.

The novel reaction of this invention leading to the formation of compounds of Formula I is graphically illustrated by the following Equation A:

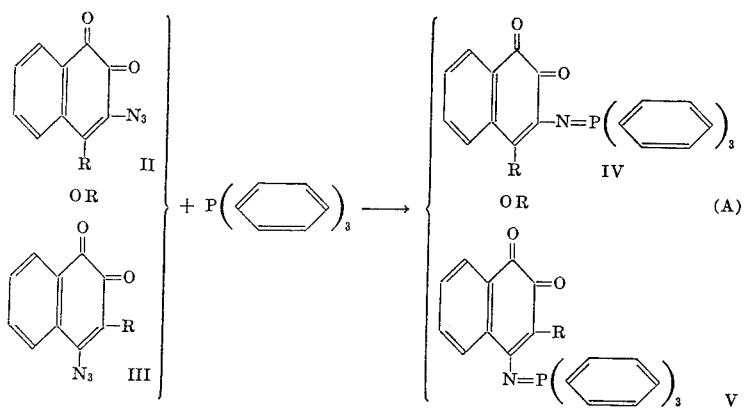

Reaction is initiated upon contact of the azido-orthoquinone with the trivalent phosphorus compound. Contact is best effected in an inert organic diluent which is preferably a solvent for the reactants. Suitable for this purpose are aromatic hydrocarbons (such as benzene and toluene), haloalkanes (such as methylene chloride, chloroform, ethylene chloride and carbon tetrachloride), halobenzenes (such as chlorobenzene), alkyl alkanoates (such as ethyl acetate), nitromethane and ethers (such as ethyleneglycol dimethyl ether and dibutylether).

Advantageously, reaction proceeds at ambient temperatures (e.g., 20°–30° C.), and neither heating nor cooling are necessary. But higher and lower temperatures may be employed, if it is desired to increase or decrease the reaction rate in any particular case. As will be noted from Equation A, one mole of the phosphorus reagent may be caused to react with each azido group or, if desired, a diazide may be reacted with only one mole of phosphorus reagent in which case a monoazido-phosphoranylideneamino-orthoquine can be obtained. After about one hour, the reaction may be terminated and the product isolated by evaporation of the diluent, and washing the residue with petroleum ether, cyclohexane, or the like. Further purification by chromatography and/or recrystallization may be effected as deemed desirable for the intended use of the product.

Compounds of Formula I are colored solid materials, insoluble in water and in many organic solvents and are thus useful as pigments. Moreover, they exhibit biocidal properties and may be used as the active components of fungicidal, bactericidal and insecticidal compositions. They may also be used as intermediates in the synthesis of other organic compounds.

The following examples are presented in further illustration of this invention. All parts are on a weight basis and all temperatures are in centigrade.

EXAMPLE 1

4-azido-1,2-naphthoquinone

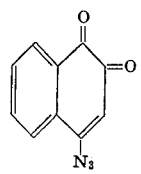

To a solution of 2.60 parts of the sodium salt of 1,2-naphthoquinone-4-sulfonic acid in 50 parts of water is added a solution of 1.00 part of sodium azide in 5 parts of water. After standing ½ hour, it is then filtered and the solid washed and dried. 0.65 part of orange crystals is obtained.

EXAMPLE 2

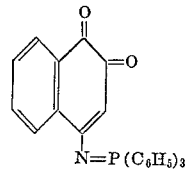

A solution of 0.70 part (0.00266 mole) of triphenylphosphine in 7 parts of methylene chloride is added to a solution of 0.50 part (0.0025 mole) of 4-azido-1,2-naphthoquinone in 25 parts of methylene chloride at 25° C.

The product, isolated by evaporating the methylene chloride and crystallizing from a suitable solvent, appears as red crystals melting at 259–260° C.

EXAMPLE 3

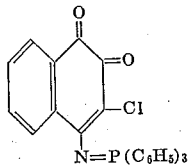

A solution of 2.40 parts of triphenylphosphine in about 15 parts of methylene chloride is added slowly to a solution of 2.00 parts of 4-azido-3-chloro-1,2-naphthoquinone in about 70 parts of methylene chloride at ambient temperature. The solvent is evaporated and the residue is triturated with benzene. The maroon-colored product, after crystallization from nitromethane, melts at 220–221° C.

We claim:
1. A compound of the formula:

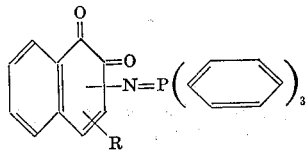

wherein R is a member selected from the group consisting of hydrogen and chlorine.
2. The compound of claim 1 where R is chlorine.
3. The compound of claim 1 where R is hydrogen.

References Cited by the Examiner

Andreeva et al.: Zhur, Obshch. Khim., vol. 30, pp. 2768–2771 (Aug. 1960).
Henne: J.A.C.S., vol. 58, pp. 882–884.
Staudinger: Helv. Chim. Acta., vol. 4, p. 861 (1921).
Staudinger: Helv. Chim. Acta., vol. 2, p. 635 (1919).
Van Wazer: Phosphorous and its Compounds, vol. 1, pp. 339–340 (1958).

LORRAINE A. WEINBERGER, *Primary Examiner.*
LEON ZITVER, *Examiner.*